3,005,266
METHOD OF REMOVING SURFACE WATER FROM ARTICLES

Hendrikus Cornelis Nicolaas van der Sanden, and Hendrikes Johannes Veenendaal, both of Eindhoven, Netherlands, assignors to North American Philips Company, Inc., New York, N.Y., a corporation of Delaware
No Drawing. Filed Mar. 27, 1958, Ser. No. 724,241
Claims priority, application Netherlands Mar. 30, 1957
4 Claims. (Cl. 34—9)

The present invention relates to a method of removing surface water from wet articles and water-removing fluids for use in such method.

The term "water-removing fluid" is to be understood to mean a liquid by which water adhering to an article, usually a metal, after the article has been subjected to a treatment with an aqueous liquid, is completely removed from this article when brought into contact with or upon immersion in this liquid.

As such a water-removing fluid use has been made of a solution in a hydrocarbon boiling between 50° C. and 370° C. of a surface-active substance. If desired a resin or wax may be added to these solutions to form a protective layer after the volatile fluid has been removed from the article by vaporization.

However, it has been found that when such water-removing fluids are repeatedly used they soon become inactive, hence the water is repelled only after long exposure and the repellent effect becomes unsatisfactory with time. Furthermore, if a resin or wax is dissolved in these prior art fluids these materials often tend to separate out thus rendering the water-repellent fluid ineffective.

It is a principal object of this invention therefore, to prepare a water-removing fluid that is free of these objectionable features of the prior art fluids.

It is a further object of the invention to prepare a water-removing fluid that retains its ability of quickly removing water from the surface of a wet article for a significantly larger number of applications than the prior art fluids.

These and other objects of the invention will be apparent from the description that follows.

According to the invention, these disadvantages of the prior art are eliminated by using as a surface-active material or wetting agent a water-insoluble salt of an ammonium base or a pyridine base containing one straight aliphatic hydrocarbon chain with 12 to 18 carbon atoms, said salt being soluble in a mixture of a hydrocarbon such as white spirit and butanol in a ratio of 9:1.

When using the water-removing fluid according to the invention a considerably larger number of articles can be treated successively without the fluid losing its ability to remove water than when the prior art fluids are used. The water gathers at the bottom of a bath in which the articles are immersed and may be drawn off at intervals.

Although the size and the shape of the articles influence the time required for this treatment, this time will not exceed 20 seconds and usually will be considerably less in the case of small-sized and simple objects. Only when using large sized articles of intricate shape will a slightly longer time be involved.

The water-insoluble salts used in the composition of the invention may be formed by adding an aqueous solution of an alkali metal salt such as the sodium or potassium polyphosphates, hexametaphosphates, tetraoxalates, bichromates and persulphates to a triethylalkylammonium base, a trimethylalkylammonium base, an n-alkylpyridine base in which the alkyl group is a straight chain hydrocarbon radical containing from 12 to 18 carbon atoms and the corresponding alkenyl compounds. The corresponding water-insoluble salt deposits after a period of time and then is dried. These water-insoluble salts are soluble in a mixture of butanol and a hydrocarbon containing up to 10% of butanol.

It has been found that butanol is sparingly soluble in water, is not completely rinsed out when used in a water-removing fluid and further that the water-repellent fluid efficiently retains its water-removing effect completely even when using it for a month on longer.

Instead of using butanol, it is often also possible to use benzene or mixtures of butanol and benzene.

The quantity of water-insoluble salts is preferably 0.1% to 0.5% by weight. However, their concentration may be further increased to approximately 8%, although this does not usually add to the efficiency of the bath.

To the water-removing fluid there may be added a small quantity of varnishing resin or wax, for example colophony or its derivatives, beeswax, Japan wax or synthetic resins soluble in the mixture of solvents used, thus avoiding finger prints and adherence of dust. Moreover, by the addition of these resins or waxes the solderability of the treated articles to other metal articles is improved. However, the addition of these resins or waxes should be small, that is to say under approximately 10% in order that the specific weight of the fluid shall not increase to a degree delaying the separation.

The articles that may be treated by the method of our invention consist of metal, for example copper, silver, cadmium, nickel or iron, or of a thermally hardened synthetic resin or of porcelain.

Our invention will now be more fully explained by reference to the following examples:

Example I

A water-removing fluid was produced by mixing 90 parts by weight of white spirit with 10 parts by weight of butanol and dissolving therein 0.06 part of weight of cetyl pyridine polyphosphate.

When wet cadmium radio chassis parts were immersed in this fluid, the water separated from the chassis parts and sank within 10 seconds to the lowest point of the tray, where it was drawn off.

No variation occurs when substituting cetyl pyridine bichromate or myristyl-trimethyl ammonium persulphate or stearyl-trimethyl ammonium bichromate for the cetyl pyridine polyphosphate.

Example II

A water-removing fluid was produced by adding to 90 parts by weight of white spirit, 10 parts by weight of butanol, 0.10 part by weight of stearyl pyridine hexametaphosphate and 3.5 parts by weight of beeswax stirred together with 10 parts by weight of trichloroethylene.

For the beeswax there may be substituted Japan wax. If desired 4 parts by weight of dymer of colophony resin may be added to it.

The beeswax may be replaced by 6.5 parts by weight of polymethylmethacrylate resin or 5 parts by weight of lanolin.

Kerosene or any one of the products sold under the trade name Stoddards solvent, oil of turpentine, V.M. and P. Naphta, mineral spirit, synthetic turpentine or the like may be substituted for white spirit.

While we have described our invention in connection with specific embodiments and applications, other modifications thereof will be readily apparent to those skilled in this art without departing from the spirit and scope of the invention as defined in the appended claims.

What is claimed is:

1. A method of removing water from the surface of a wet article comprising immersing said wet article in a water-removing composition consisting essentially of a hydrocarbon having a boiling point range between about 50° C. and 370° C. and a wetting agent in an amount of from about 0.1% to 8% by weight, said wetting agent being a water-insoluble salt of a nitrogen base selected from the group consisting of triethylalkyl-ammonium bases, trimethylalkyl-ammonium bases, and the n-alkylpyridine bases and the corresponding alkenyl derivatives in which the alkyl and alkenyl groups are straight chain radicals containing from 12 to 18 carbon atoms and an anion selected from the group consisting of the polyphosphates, hexametaphosphates, tetaoxalates, bichromates and persulphates, said wetting agent being soluble in a hydrocarbon-butanol mixture having a ratio of 9:1 to thereby form a separate water layer and drawing off said water layer.

2. A method of removing water from the surface of a wet article comprising immersing said wet article in a water-removing composition consisting essentially of a hydrocarbon having a boiling point range between about 50° C. and 370° C. and a wetting agent in an amount of from about 0.1% to 0.5% by weight, said wetting agent being a water-insoluble salt of a nitrogen base selected from the group consisting of triethylalkyl-ammonium bases, trimethylalkyl-ammonium bases, and the n-alkylpyridine bases and the corresponding alkenyl derivatives in which the alkyl and alkenyl groups are straight chain radicals containing from 12 to 18 carbon atoms and an anion selected from the group consisting of the polyphosphates, hexametaphosphates, tetraoxalates, bichromates and persulphates, said wetting agent being soluble in a hydrocarbon-butanol mixture having a ratio of 9:1 to thereby form a separate water layer and drawing off said water layer.

3. A method of removing water from the surface of a wet article comprising immersing said wet article in a water-removing composition consisting essentially of a hydrocarbon having a boiling point range between about 50° C. and 370° C. and a wetting agent in an amount of from about 0.1% to 0.5% by weight and a wax in an amount up to about 10%, said wetting agent being a water-insoluble salt of a nitrogen base selected from the group consisting of triethylalkyl-ammonium bases, trimethylalkylammonium bases, and the n-alkylpyridine bases and the corresponding alkenyl derivatives in which the alkyl and alkenyl groups are straight chain radicals containing from 12 to 18 carbon atoms and an anion selected from the group consisting of the polyphosphates, hexametaphosphates, tetraoxalates, bichromates and persulphates, said wetting agent being soluble in a hydrocarbon-butanol mixture having a ratio of 9:1 to thereby form a separate water layer and drawing off said water layer.

4. A method of removing water from the surface of a wet article comprising immersing said wet article in a water-removing composition consisting essentially of a hydrocarbon having a boiling point range between about 50° C. and 370° C. and a wetting agent in an amount of from about 0.1% to 0.5% by weight and a resin in an amount up to about 10%, said wetting agent being a water-insoluble salt of a nitrogen base selected from the group consisting of triethylalkyl-ammonium bases, trimethylalkyl-ammonium bases, and the n-alkylpyridine bases and the corresponding alkenyl derivatives in which the alkyl and alkenyl groups are straight chain radicals containing from 12 to 18 carbon atoms and an anion selected from the group consisting of the polyphosphates, hexametaphosphates, tetraoxalates, bichromates and persulphates, said wetting agent being soluble in a hydrocarbon-butanol mixture having a ratio of 9:1 to thereby form a separate water layer and drawing off said water layer.

References Cited in the file of this patent

UNITED STATES PATENTS

| | | |
|---|---|---|
| 2,137,404 | Hollerer | Nov. 22, 1938 |
| 2,165,356 | Dunbar | July 11, 1939 |
| 2,236,445 | Pfeiffer | Mar. 25, 1941 |
| 2,295,912 | Pagenkopf | Sept. 15, 1942 |
| 2,321,517 | Rosen | June 8, 1943 |
| 2,523,100 | Eby | Sept. 19, 1950 |
| 2,584,123 | Gruenwald | Feb. 5, 1952 |
| 2,717,224 | McConnell et al. | Sept. 6, 1955 |

FOREIGN PATENTS

| | | |
|---|---|---|
| 155,318 | Great Britain | Dec. 6, 1920 |
| 143,225 | Australia | May 5, 1949 |